United States Patent [19]

Shaw

[11] 4,031,477

[45] June 21, 1977

[54] SYSTEM FOR TRANSFERRING FOUR COMMANDS OVER A SINGLE CONDUCTOR UTILIZING DUAL THRESHOLD LOGIC GATES

[75] Inventor: Mark Layne Shaw, Austin, Tex.

[73] Assignee: Motorola, Inc., Schaumburg, Ill.

[22] Filed: Apr. 26, 1976

[21] Appl. No.: 679,964

[52] U.S. Cl. .............................. 328/70; 307/223 R; 307/350; 328/103; 328/152
[51] Int. Cl.² .......................................... H03K 3/02
[58] Field of Search ...... 307/207, 208, 209, 223 R, 307/235 R, 235 N; 328/70, 71, 75, 103, 105, 153, 152, 154; 340/160, 161, 169, 172, 294, 365 R

[56] References Cited

UNITED STATES PATENTS 3,969,633  7/1976  Paluck et al. .................. 307/209 X

*Primary Examiner*—John Zazworsky
*Attorney, Agent, or Firm*—Charles R. Hoffman

[57] ABSTRACT

A zener diode and resistor network is coupled to a single conductor by a switching device which, in combination with the network, produces a voltage on the conductor representative of one of four commands selected by the switching device. Another zener diode and resistor network is coupled to the receiving end of the transmission conductor and operates to generate two ternary signals which, in combination, are representative of the selected command. A plurality of dual-threshold CMOS logic gates generates four binary output signals responsive to the two ternary signals.

9 Claims, 5 Drawing Figures

SYSTEM FOR TRANSFERRING FOUR COMMANDS OVER A SINGLE CONDUCTOR UTILIZING DUAL THRESHOLD LOGIC GATES

BACKGROUND OF THE INVENTION

1. Field of the Invention

The invention relates to systems for transmitting one of a plurality of commands along a conductor and generating a plurality of output signals representative of the transmitted command.

2. Brief Description of the Prior Art

In various applications, such as in an automotive electronic systems, it is desirable to be able to select one of a plurality of command signals by, for example, activating one or more switches, at a "remote site" or "sending site" and have signals generated at a receiving site representative of the selected command. Apparatus for accomplishing transmission of selected commands to the receiving site have involved use of a plurality of conductors, one conductor for transmitting respectively, each selected command. Other systems have utilized a single wire or conductor coupled between the sending device and the receiving device. Use of a single conductor reduces the cost of the system by eliminating the costs associated with the use of several conductors. The apparatus at the sending site of the system has produced a different voltage level on the conductor corresponding to each of the possible selectable commands. Circuitry on the receiving end has been used to discriminate the various voltage levels on the transmission conductor to generate a plurality of binary output signals, which may then be utilized as inputs by digital logic circuitry which may perform various control functions as, for example, controlling an electronically controlled automotive cruise control system. However, the cost of the electronic discriminating circuitry for such systems is quite high, and may outweigh the cost in reducing the number of transmission conductors. Typically, a plurality of comparator circuits have been utilized to differentiate or detect each of the voltage levels that may appear on the single transmission conductor. For example, if four voltage levels, corresponding to four selectable commands, may be sent down the transmission conductor, four comparators are required, which are capable of generating four binary output signals, corresponding to the four commands.

SUMMARY OF THE INVENTION

It is an object of the invention to provide a system for receiving a selected one of a plurality of analog signals on a conductor and converting it to a plurality of pairs of ternary signals on a pair of conductors, each pair of ternary signals being representative of one of the analog signals.

Briefly described, the invention is a system for receiving at a receiving circuit, one of a plurality of analog signals and in response thereto generating a pair of ternary signals which in combination represent the selected analog signal. Dual threshold digital circuitry is coupled to the receiving circuit for generating a plurality of binary output signals at a plurality of output conductors representative of the selected analog signal.

DESCRIPTION OF THE INVENTION

Figure 1:
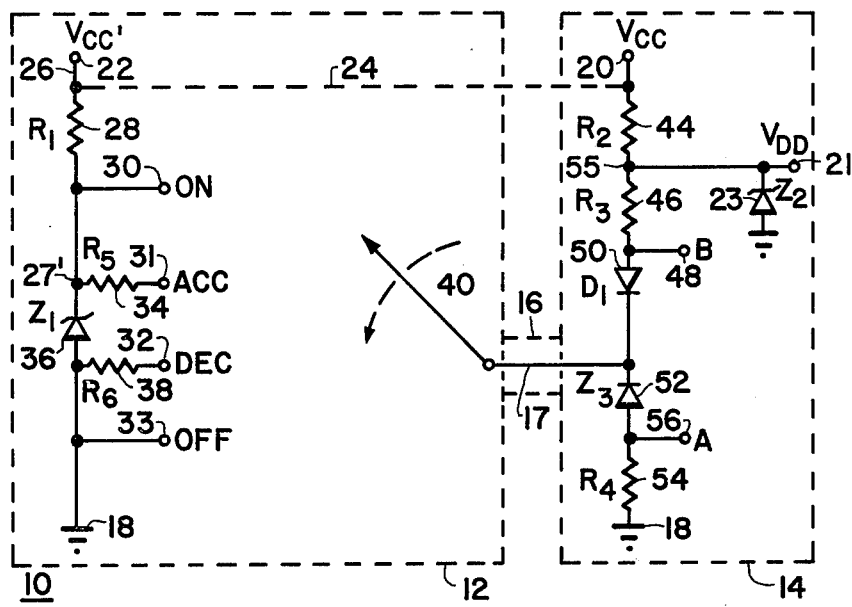
FIG. 1 is a schematic diagram of a presently preferred embodiment of the invention.

Referring to FIG. 1, system 10 includes sending circuitry 12, receiving circuitry 14, and coupling means 16 coupled therebetween. In a presently preferred embodiment of the invention, the system includes sending circuitry 12 located on the steering wheel of an automobile, a single-wire transmission conductor running through or along the steering column of the automobile, from sending circuitry 12 to receiving circuitry 14 located elsewhere in the automobile. Switching device 40 is coupled to conductor 17, and may be any type of switching device which is capable of coupling conductor 17 to one of four terminals 30, 31, 32 or 33, and is also capable of leaving the sending side of conductor 17 unconnected to any of the terminals.

Sending circuit 12 includes ground conductor 18. Terminal 33, designated OFF, is coupled to ground conductor 18. When switch 40 contacts terminal 33, the OFF command is sent along transmission conductor 17 to receiving circuit 14. Resistor 38, designated R6, is coupled between terminal 32, designated DEC, and ground conductor 18. When switch 40 contacts terminal 32 a voltage representative of a DECELERATE command is sent to receiving circuit via transmission conductor 17. Zener diode 36, designated Z1, is coupled between ground conductor 18 and node 27'. Resistor 34, designated R5, is connected between terminal 31, designated ACC, and node 27'. The voltage on node 31 represents an ACCELERATE command when switch 40 contacts terminal 31. Terminal 30, designated ON, is connected to node 27'. The voltage on terminal 30 represents an ON command when switch 40 contacts terminal 30. Resistor 28 designated R1, is connected between supply voltage $V_{cc}$ and node 27'.

Receiver circuitry 14 includes resistor 44, designated R2, connected between $V_{CC}$ conductor 20 and node 55. Note that the upper end of resistor R1 can be alternatively connected to $V_{CC}$ conductor 20 or $V_{CC}$ conductor 22, depending on whether the dotted connections 24 is selected to be a short circuit or an open circuit connection. Clearly, there is no need that both circuits 12 and 14 be connected to the same supply voltage conductors, as long as both supply adequate voltage. $V_{DD}$ conductor 21 is connected to node 55. $V_{DD}$ is the voltage supplied by receiver circuit 14 to the logic circuitry shown in FIGS. 2 and 3. Zener diode 23, designated Z2, is connected between ground conductor 18 and node 55. Resistor 46, designated R3, is connected between node 55 and output conductor 48, designated B. Diode 50, designated D1, is connected between node 48 and transmission conductor 17. Zener diode 52, designated Z3, is connected between transmission conductor 17 and node 56, designated A. Resistor 54, designated R4, is connected between ground conductor 18 and node 56.

Table 1 lists suitable values of components in FIG. 1.

TABLE 1

| | |
|---|---|
| R1 | 100 ohms |
| R2 | 300 ohms |
| R3 | 1 kilohm |
| R4 | 1 kilohm |
| R5 | 1 kilohm |
| R6 | 1 kilohm |
| $V_{CC}$ | 12 volts |
| $V_{CC'}$ | 12 volts |
| $V_{Z1}$ | 10 volts |
| $V_{Z2}$ | 5 volts |
| $V_{Z3}$ | 5 volts |
| $V_{DD}$ | 5 volts |

The operation of send and receive circuits 12 and 14 is designated in the right hand side of Table 2.

TABLE 2

| | SEND & RECEIVE CIRCUITS | | | DUAL THRESHOLD CMOS LOGIC CIRCUIT | | | |
|---|---|---|---|---|---|---|---|
| Switch | Transmission Line | A | B | ON | ACC | DEC | OFF |
| ON | $V_{Z1}$ | $V_{DD}$ | $V_{DD}$ | 1 | 0 | 0 | 0 |
| ACC | $\frac{V_{Z1} - V_{Z3}}{2} + V_{Z3}$ | $\frac{V_{Z1} - V_{Z3}}{2}$ | $V_{DD}$ | 0 | 1 | 0 | 0 |
| DEC | $\frac{V_{DD} - V_{D1}}{2}$ | 0 | $V_{D1} + \frac{V_{DD} - V_{D1}}{2}$ | 0 | 0 | 1 | 0 |
| OFF | 0 | 0 | $V_{D1}$ | 0 | 0 | 0 | 1 |
| OPEN | $V_{DD}$ | 0 | $V_{DD}$ | 0 | 0 | 0 | 0 |

Figure 2:
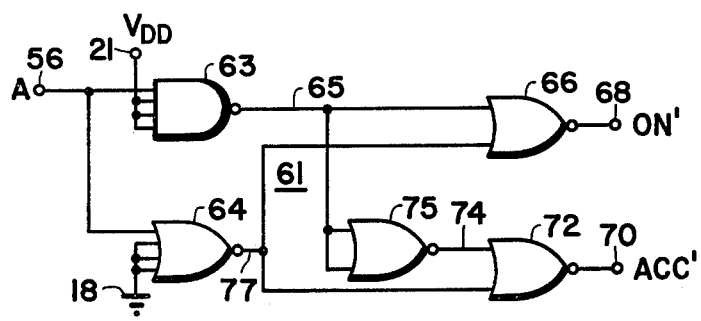
FIG. 2. is a logic diagram of circuitry which may be coupled to the circuit of FIG. 1 in a presently preferred embodiment of the invention.

Referring to FIG. 2, circuit 61 is connected to node 56, which receives signal A from receiving circuit 14 of FIG. 1. The outputs of circuit 61 appear at nodes 68 and 70, designated, respectively, ON' and ACC', corresponding to the ON and ACCELERATE commands. Circuit 61 includes a four input NAND gate 63 having one input connected to node 56 and having its other three inputs connected to $V_{DD}$ terminal 21 of FIG. 1. Two-input NOR gate 66 has its output connected to node 68 and has one input connected to output 65 of NAND gate 63. NOR gate has one input connected to node 56 and its other three inputs connected to ground conductor 18 and has its output 77 connected to the other input of two-input NOR gate 66. Two input NOR gate 75 has both inputs connected to output 65 of NAND gate 63 and has its outuput 74 connected to an input of NOR gate 72. Two-input NOR gate 72 has its output connected to node 70, and has its other input connected to output 77 of NOR gate 64.

Figure 3:
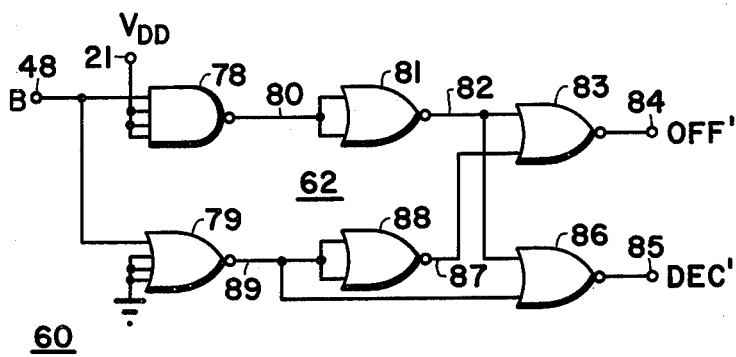
FIG. 3 is a logic diagram of additional circuitry which may be coupled to the circuit of FIG. 1 in a presently preferred embodiment of the invention.

Referring to FIG. 3, circuit 62 has its input connected to node 48, which receives signal B from receiving circuit 14. Circuit 62 has one output connected to node 84, designated OFF', corresponding to the OFF command, and another output connected to node 85, for generating a signal designated DEC', corresponding to DECELERATE command. Circuit 62 includes NAND gate 78 having an output connected to node 80, and one input connected to node 48 and three inputs connected to $V_{DD}$ terminal 21 of FIG. 1. NOR gate 79 has an output connected to node 89, three inputs connected to ground conductor 18 and one input connected to node 48. Two input NOR gate 81 has both inputs connected to node 80 and an ouput connected to node 82. Two input NOR gate 88 has both inputs connected to node 89 and output connected to node 87. Two input NOR gate 83 has an output connected to node 84, one input connected to node 82, and another input connected to node 87. Two input NOR gate 86 has an output node 85, one input connected to node 82, and another input connected to node 89.

The operation of logic circuitry 60 is indicated in Table 2, which is essentially a truth table of the circuits of FIGS. 1 and 2. The logical 1 voltages approximately equal to $V_{DD}$ volts are represented in Table 2 by 1's and the logical 0 voltages equal to approximately 0 volts are represented in Table 1 by 0's. Table 2 therefore indicates the voltages appearing on nodes 68, 70, 84 and 85 for each of the possible positions of switch 40. The voltages appearing on the transmission line 17 are also shown in Table 2.

Figure 3A:
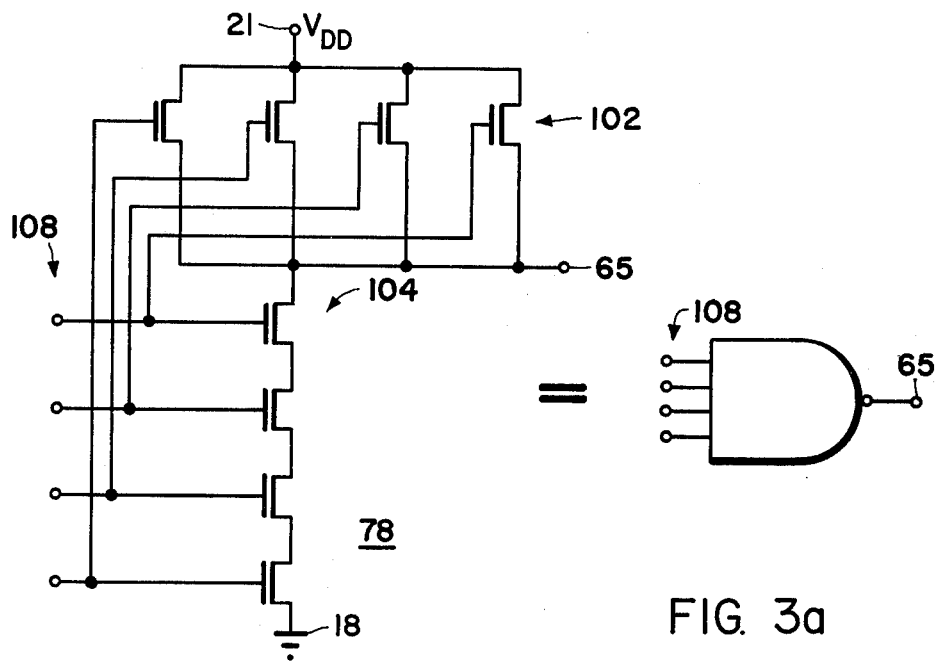
FIG. 3A is a schematic diagram of an embodiment of a CMOS NAND gate.
Figure 3B:
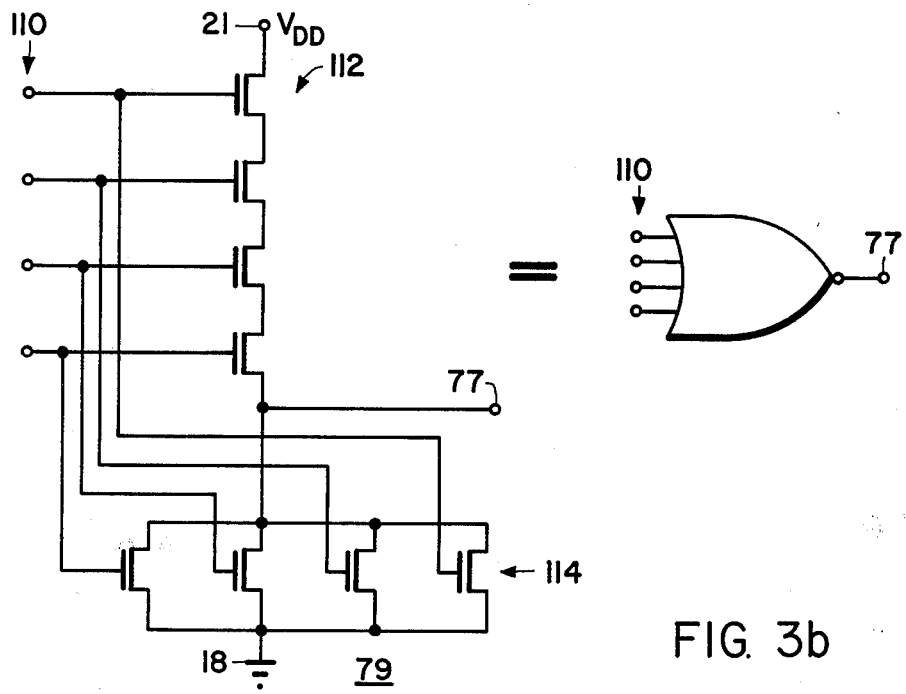
FIG. 3B is a schematic diagram of an embodiment of a CMOS NOR gate.

FIG. 3A shows a schematic diagram of a typical CMOS implementation of NAND gate 63. NAND gate 78 is implemented similarly. The four upper MOSFETs 102 are P channel devices, and the four lower series connected MOSFETs 104 are N-channel devices. The terminals 108 are the inputs and terminal 65 is the output. The length to width ratios of the MOSFETs 102 and 104 can be chosen to provide the desired dual thresholds. (For more information of MOSFETs, see "Physics and Technology of Semiconductor Devices" by Grove, John Wiley, 1967.) The two NAND gates in FIG. 2 and FIG. 3 are designed so that a voltage appearing at one of the inputs, with the other three inputs being at 0 volts, will cause the NAND gate to switch at a voltage approximately equal to two-thirds $V_{DD}$, where $V_{DD}$ is applied as indicated in FIG. 3A. All of the CMOS gates shown in FIG. 2 have their $V_{DD}$ terminals connected to $V_{DD}$ terminal 21 of FIG. 1 in a presently preferred embodiment of the invention.

For input NOR gate 64 in FIG. 2 and for input NOR gate 79 in FIG. 3 each have their MOSFET geometry ratios selected such that one input has a voltage threshold (at which the four-input NOR gate will switch) equal to one-third $V_{DD}$ if the other three inputs are connected to 0 volts.

Consequently, it is seen that the input stages of both circuit 61 and 62, each comprising a four input NAND gate wih three inputs to $V_{DD}$ and a four input NOR gate with three inputs grounded constitute a dual threshold input circuit. This dual threshold can also be accomplished by selected device geometry in single input inverting means.

Thus, circuit 61 will produce three combinations of ternary output voltages on nodes 68 and 70 corresponding to the conditions when the voltage A is less than one-third $V_{DD}$, between one-third $V_{DD}$ and two-thirds $V_{DD}$, and greater than two-thirds $V_{DD}$. Similarly, circuit 62 will also provide three combinations of two ternary voltages at nodes 84 and 85, corresponding to the conditions when B is less than one-third $V_{DD}$, between one-third $V_{DD}$ and two-thirds $V_{DD}$, and greater than two-thirds $V_{DD}$. Of course, dual threshold voltage input circuitry can be implemented in other technologies than CMOS, such as P-MOS, N-MOS, or bipolar.

The operation of the circuitry shown in FIG. 1 is that if switch 40 is open, for the values shown in Table 1, zener diode Z3 is off, B is $V_{DD}$ volts, i.e. at 5 volts, (which is the breakdown voltage of zener diode Z2), and voltage A is at 0 volts, since no current flows through R4. If switch 40 contacts node 30, transmission conductor 17 is at $V_{Z1}$ volts, i.e., 10 volts, diode D1 is reverse biased, so B remains at $V_{DD}$ volts, and zener diode Z3 is reverse biased, so that voltage A is $V_{Z1}-V_{Z3}$ volts, i.e., is at 10 volts minus 5 volts, equal to 5 volts. If switch 40 contacts node 31, diode D1 is still reverse biased, and voltage B remains at $V_{DD}$ volts, and each of resistors R4 an R5 have $(V_{Z1}-V_{Z3})/2$ volts across them. Therefore, voltage A is at $(V_{Z1}-V_{Z3})/2$ volts.

If switch 40 contacts node 32, then each of resistors R3 and R6 have $(V_{Z2}-V_{D1})/2$ volts across them. Therefore, zener diode Z3 is off, and A is at zero volts, and B is at $V_{DD}$ (i.e., $V_{Z2}$) minus $(V_{DD}-V_{D1})/2$. Finally, if switch 40 contacts node 33, zener diode Z3 is clearly off, and voltage A is at 0 volts, and voltage B is $V_{D1}$ volts, which is a logical 0. From this information, one skilled in the art can readily verify that the circuitry shown in FIGS. 1 and 2 operates to produce the results shown in Table 2.

What is claimed is:

1. A system for transmitting a selected one of a plurality of commands along a conductor comprising:
   selection means for selecting one of said plurality of commands;
   transmitting means coupled to said conductor and said selection means for generating a signal on said conductor representative of said selected command;
   receiving means coupled to said conductor for receiving said signal and generating a pair of ternary signals which represent said selected command;
   digital means coupled to said receiving means and to a plurality of output conductors for generating a binary output signal representative of said selected command at one of said plurality of output conductors.

2. The system as recited in claim 1 wherein said digital means includes dual threshold logic circuitry having inputs coupled to said receiving means.

3. The system as recited in claim 2 further including a pair of conductors conducting said pair of ternary signals, and further including first and second NAND gates each having an input coupled, respectively, to one of said first and second conductors and each having its remaining inputs coupled to a first voltage conductor having a logical 1 voltage thereon, and also including first and second NOR gates each having, respectively, one input connected to one of said first and second conductors and its other inputs coupled to a second voltage conductor having a logical 0 voltage thereon.

4. The system as recited in claim 3 wherein said first NAND gate has its output coupled to one input of a third NOR gate and also to an input of a first inverting circuit means having an output coupled to an input of a fourth NOR gate, another input of said fourth NOR gate and another input of said third NOR gate being coupled to an output of said first NOR gate.

5. The system as recited in claim 4 wherein said second NAND gate has an output connected to an input of second inverting circuit means, said second inverting circuit means having an output connected to an input of a fifth NOR gate, said second NOR gate having an output connected to an input of third inverting circuit means and also connected to an input of a sixth NOR gate, said third inverting circuit means having an output connected to an input of said fifth NOR gate, said output of said second inverting circuit means connected to an input of said sixth NOR gate, said third, fourth, fifth and sixth NOR gates having outputs coupled, respectively, to first, second, third, and fourth output conductors.

6. The system as recited in claim 1 wherein said transmitting means includes means coupled between a first voltage conductor and a second voltage conductor for generating first, second, third, and fourth command voltages on first, second, third, and fourth nodes, representative of said first, second, third, and fourth commands when said first, second, third, or fourth node, respectively, is coupled to said selection means.

7. The system as recited in claim 6 wherein said circuit means includes a first resistor coupled between said first voltage conductor and said fist node, a second resistor coupled between said first node and said second node, a zener diode having its cathode coupled to said first node and its anode coupled to said fourth node, a third resistor coupled between said fourth node and said third node, said fourth node also being coupled to said second voltage conductor.

8. The system as recited in claim 1 wherein said selection means is connected to said conductor.

9. The system as recited in claim 1 wherein said receiving means includes a first resistor coupled between a first voltage conductor and a first node, a first zener diode having its cathode connected to said first node and its anode connected to a said second voltage conductor, a second resistor coupled between said first node and a second node, said second node also being coupled to a second conductor whereon said one of said ternary signals is generated, a diode having an anode coupled to said second node and a cathode coupled to said conductor, a second zener diode having a cathode coupled to said conductor and an anode coupled to a third node, said third node also being coupled to a third conductor whereon said second ternary signal is generated, and a third resistor coupled between said third node and second voltage conductor.

* * * * *